US 6,677,979 B1

(12) United States Patent
Westfield

(10) Patent No.: US 6,677,979 B1
(45) Date of Patent: Jan. 13, 2004

(54) METHOD AND APPARATUS FOR DUAL IMAGE VIDEO TELECONFERENCING

(75) Inventor: William Chops Westfield, Atherton, CA (US)

(73) Assignee: Cisco Technology, Inc., San Jose, CA (US)

(*) Notice: Subject to any disclaimer, the term of this patent is extended or adjusted under 35 U.S.C. 154(b) by 149 days.

(21) Appl. No.: 09/880,236

(22) Filed: Jun. 12, 2001

(51) Int. Cl.⁷ .................................................. H04N 7/14
(52) U.S. Cl. ................................ 348/14.12; 348/14.13; 348/14.08
(58) Field of Search ................ 348/14.01–14.09, 348/14.1, 14.11, 14.12, 14.13, 14.16, 220; 370/260, 261; 709/204, 205; H04N 7/14

(56) References Cited

U.S. PATENT DOCUMENTS

| 5,926,218 A | | 7/1999 | Smith .......................... 348/358 |
| 5,990,932 A | * | 11/1999 | Bee et al. ..................... 348/14.08 |
| 6,147,709 A | | 11/2000 | Martin et al. ................. 348/239 |
| 6,343,116 B1 | * | 1/2002 | Qinton et al. ................. 379/93.01 |

FOREIGN PATENT DOCUMENTS

| JP | 406105306 A | * | 4/1994 | ............ H04N/7/15 |
| JP | 410294939 A | * | 11/1998 | ............ H04N/7/14 |
| JP | 411298873 A | * | 10/1999 | ............ H04N/7/15 |
| JP | 2000-032319 | * | 1/2000 | .......... H04N/5/232 |
| JP | 2000152204 A | * | 5/2000 | ............ H04N/7/15 |

* cited by examiner

Primary Examiner—Melur Ramakrishnaiah
(74) Attorney, Agent, or Firm—Ritter, Lang & Kaplan LLP

(57) ABSTRACT

Systems and methods for providing digital video teleconferencing over a network that allows a user to view the event in a manner more closely approximating live viewing are provided, while not requiring excessive use of bandwidth. Low resolution and high resolution of a videoconference event are obtained, preferably by using two cameras at the event. A whole eye view is sent to clients at low resolution. A user at the client can select one or more areas of interest to him ("attention windows"). High resolution data from the attention window(s) selected by each user is sent to the respective client. The client displays the whole eye view and the attention window data.

14 Claims, 11 Drawing Sheets

Low-Resolution Image　　　High-Resolution Image

Sample Client List

| IP Address | First Corner of Window | Second Corner of Window | Update Period (relative) |
|---|---|---|---|
| 118,06,07,01 | 1000,650 | 3000,300 | 1 |
| 210,03,24,18 | 50,300 | 1100,150 | 1 |
| 212,10,46,03 | 1,1000 | 50000,400 | 4 |
| . . . | . . . | . . . | . . . |

FIG. 11

METHOD AND APPARATUS FOR DUAL IMAGE VIDEO TELECONFERENCING

The present invention relates to digital video teleconferencing. In particular, it relates to sending data of images of different resolution and different coverage to enable a remote viewer of an event to have a richer and more detailed viewing experience.

Video teleconferencing for business and pleasure purposes is becoming increasingly important and more convenient. For example, it is becoming common to present lectures at remote classrooms and to provide business presentations to multiple sites, and it is possible for a user to receive video conferencing feeds on a home computer.

With the increasing popularity of digital video teleconferencing, it is desirable to economically achieve a greater versatility and wider range of capabilities. For teleconferencing, where the number of users of a given video feed is relatively small, e.g. tens or hundreds, cost and accordingly bandwidth usage must be relatively small.

It is known to use a single fixed camera in a video teleconference, which provides little flexibility. An improvement is to have a human cameraman walk around and manipulate the camera lens to provide a view of interest, for example a wide view of an audience or a close-up of a speaker. Multiple views can be provided by having multiple cameramen, cameras, and special processing equipment and a director to select between the views. However, this can be expensive.

Similarly, it is known to have a user camera that can be remotely controlled, (e.g. pan, tilt, zoom), by a viewer. However such methods are costly and cumbersome, and the physical movement of the camera relatively slow. In addition, a single viewing image is provided at a given time.

It is also known to use an electronic whiteboard, where an image, such as marks on a whiteboard or digitally stored slides, are sensed electronically and transmitted to a remote location. However, this requires having an electronic whiteboard at the live site, which may not always be possible, due to, for example, problems related to mobility and connections. In addition, the user still is afforded little choice of views.

A problem with known methods is that they do not economically provide a way for multiple individuals to obtain details of a sub-image while also providing an overview of the image. Such as view would mimic human habits of focusing on various areas of interest ("attention points" or "attention windows") from time to time while retaining peripheral vision of a broader field ("whole-eye-view" or "wide angle view"). For example, the viewer may focus on a speaker's face, then on a slide that is being projected, while all along noticing movements occurring throughout the room.

A way to provide flexibility to the user would be to allow him to designate an attention window on a normal video window, and to display this area at an enlarged size. A major problem with such an approach is that because current videoconference data is provided at relatively low resolution due to bandwidth limitations, an enlarged image would provide a low quality or blurry image, which would be of limited use.

Another way to provide a system that more closely mimics human vision would be to send a high resolution image of the whole-eye-view to each member of the electronic audience ("user" or "client"). The entire view could be displayed either at high resolution or at some reduced resolution, assuming the client has sufficient processing power. Each client can be configured so that attention windows can be expanded to achieve detail; because of the high resolution of the data, the expanded image would still provide a relatively sharp image. However, due to present day limitations in bandwidth (as well as processing speed at clients), sending so much data is expensive, impractical and in some cases impossible. (Using technology commonly in use today, it is generally desirable that a videoconference operate over as little as about 128 kilobits per second (assuming dual channel ISDN), although that will change as DSL, Cable and other improved connections become more common. A typical web or video conference may have about VGA resolution (640×480 pixels) or less.)

Digital video teleconferencing is becoming increasingly popular and is being used in increasingly diverse applications. Accordingly, it would be advantageous to provide an economical way to provide video teleconferencing that would allow a user to experience an event in a manner more closely approximating being present at the event, while not requiring prohibitive amounts of bandwidth.

SUMMARY OF THE INVENTION

Systems and methods for providing digital video teleconferencing over a network that allows a user to view the event in a manner more closely approximating live viewing are provided, while not requiring excessive use of bandwidth. Low resolution and high resolution views of a videoconference event are obtained, preferably by using two cameras at the event. A whole eye view is sent to clients at low resolution. A user at the client can select one or more areas of interest to him ("attention windows"). High resolution data from the attention window(s) selected by each user is sent to the respective client. The client displays the whole eye view and the attention window data.

In one embodiment of the invention, a method for providing video teleconferencing is provided. A low resolution data stream comprising an image of a first field of view from an event and a high resolution data stream comprising a second image of a second field of view are received at a server. The first field of view and the second field of view have areas of overlap. The server sends the low resolution data stream to a plurality of clients. The client also sends a subset of the high resolution data stream to each of the plurality of clients.

In another embodiment, a system for providing teleconferencing is provided. The system includes two cameras. The cameras are disposed so that their fields of view overlap. One of the cameras sends a low resolution data stream to a first computer, which sends the low resolution data stream to one or more clients. Similarly, the other camera sends a high resolution to a computer, which can be the same computer or a different computer as the first computer. For each of the clients, the computer sends a portion of the high resolution data stream to the client. The portion of the data sent can be different for each client.

In another embodiment, a method for providing video conferencing at a client is provided. Incoming high resolution data is displayed. Incoming low resolution data is displayed, resulting in a low resolution display. When a user request to select an attention point is received, the attention point information associated with the user request is sent to a source of the high resolution data.

A further understanding of the nature and advantages of the inventions herein may be realized by reference to the remaining portions of the specification and the attached drawings.

BRIEF DESCRIPTION OF THE DRAWINGS

FIG. 11 is a sample client list.

DESCRIPTION OF SPECIFIC EMBODIMENTS

Embodiments of the invention are described below with reference to specific processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Figure 1:
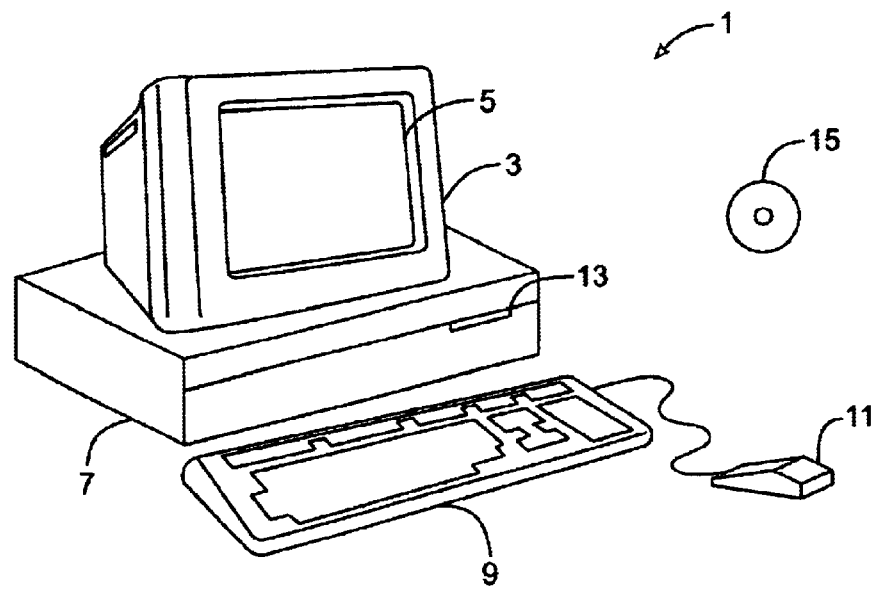
FIG. 1 illustrates an example of a computer system that can be utilized to execute the software of an embodiment of the invention.

FIG. 1 illustrates an example of a computer system that can be used to execute software implementing a method of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
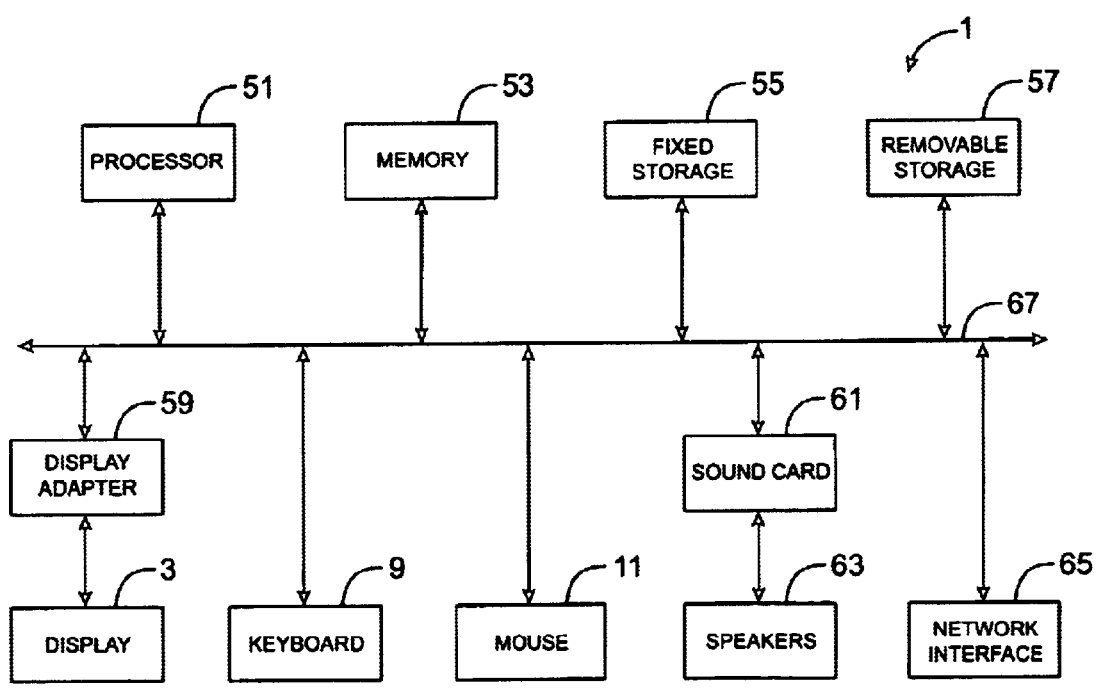
FIG. 2 illustrates a system block diagram of the computer system of FIG. 1.

FIG. 2 shows a system block diagram of a computer system 1 that can be used to execute software implementing a method of an embodiment of the invention. As in FIG. 1, computer system 1 includes monitor 3, keyboard 9, and mouse 11. Computer system 1 further includes subsystems such as a central processor 51, sound card 61, speakers 63, system memory 53, fixed storage 55 (e.g., hard drive), removable storage 57 (e.g., CD-ROM drive), display adapter 59, and network interface 65. Other computer systems suitable for use with the invention can include additional or fewer subsystems. For example, another computer system could include additional processors or a cache memory, or could have multiple processors (i.e. a multiprocessor system rather than a uniprocessor system).

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
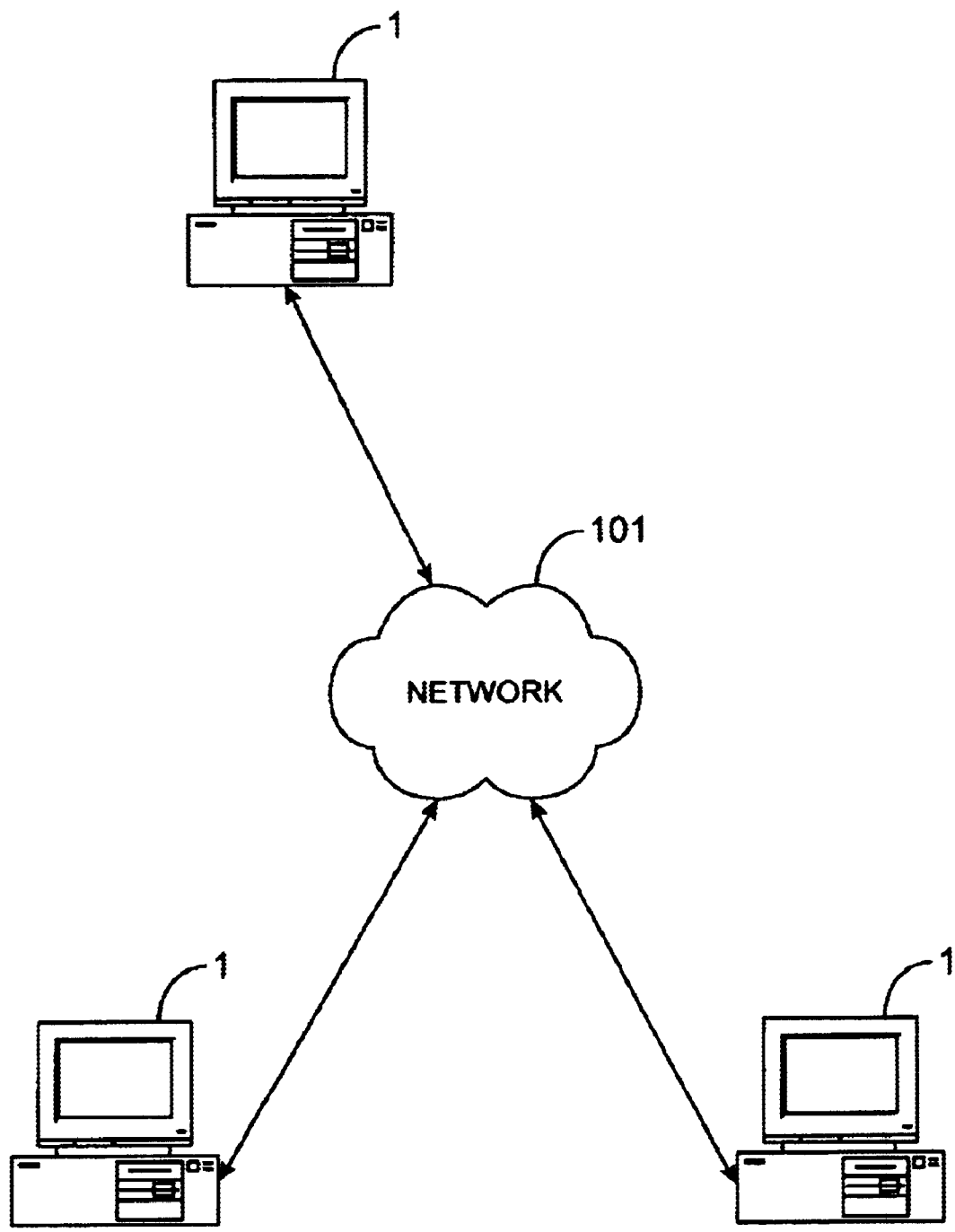
FIG. 3 illustrates a network of multiple computer systems such as the Internet.

FIG. 3 shows a schematic drawing of a network of multiple computer systems. A network 101 provides communication between multiple computer systems 1. In an embodiment of the invention, such multiple computer systems 1 can act as a computer client displaying data, a server, or an intermediary computer. Such multiple computer systems 1 can include computer systems such as shown in FIG. 1 and FIG. 2.

Figure 4:
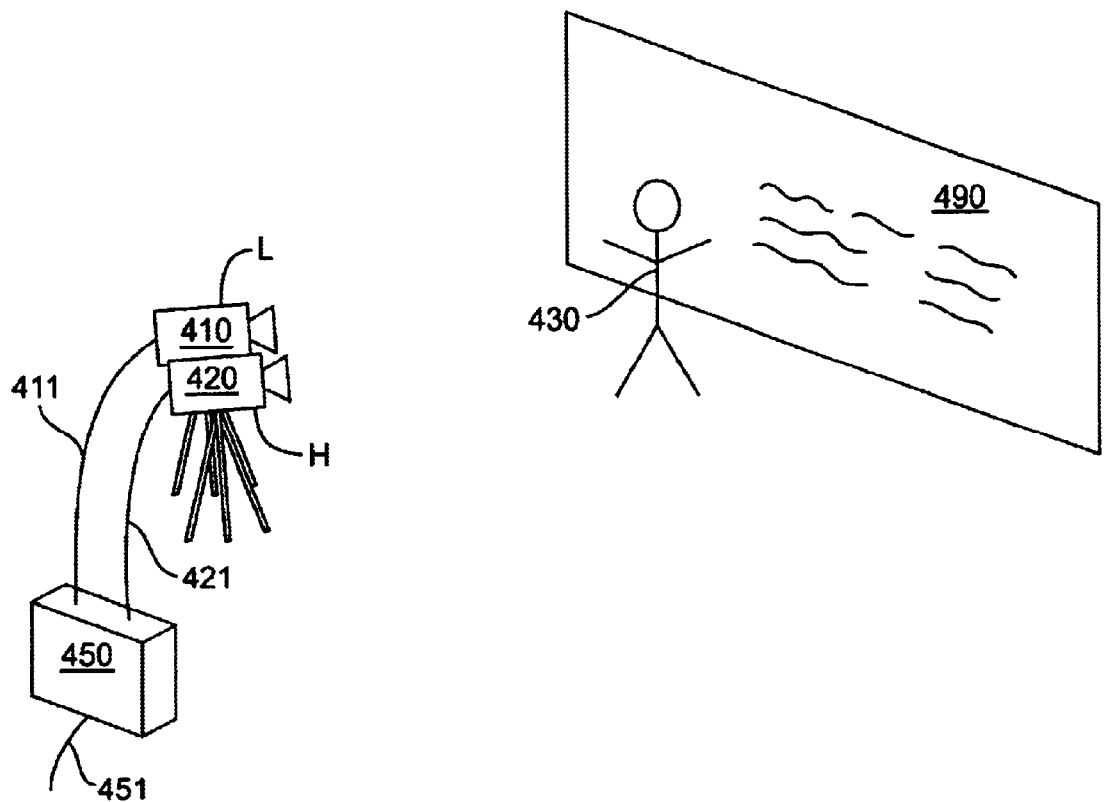
FIG. 4 is a schematic drawing of an embodiment of the invention.

FIG. 4 shows a perspective sketch of an embodiment of a system deployed in a sample environment. A low resolution camera 410 is pointed toward a presentation. The presentation includes a human speaker 430 and a chalkboard 490. A high resolution camera 420 is also pointed toward the presentation.

Preferably the two cameras 410, 420 are disposed so that they have substantially the same field of view; i.e. so that the mapping between the two fields of view that overlaps objects can be approximated as 1:1, and so that the fields of view show approximately the same part of the space being "recorded". It is not necessary that the views be identical. That is, the image included in the upper half of the image imaged by low resolution camera 410 shows the same part of the presentation as the image in the upper half of the image imaged by high resolution camera 420, approximately.

However, the two cameras alternatively can be disposed so that the fields of view are not substantially similar, in which case a non-one-to-one mapping can be done between the two fields of view. For example, low resolution camera 410 can be located in a back corner of the presentation space whereas high resolution camera 420 can be located near the middle of the room and can have a smaller field of view. Similarly, the two cameras can be located approximately at the same position, but the low resolution being on "zoom" so that its field of view is smaller. Also for example, camera 410 can include a wide angle lens while high resolution camera 420 can include a standard lens. Known methods of mapping the two fields of view can be used to map between the two fields of view.

Given current commonly present bandwidth constraints on the internet, the low resolution camera 410 can have, for example, approximately VGA resolution (640×480 pixels), and the high resolution camera 420 can have, for example resolution of about 2048×1526 pixels. "High" and "low" resolution are relative terms. An increase in available bandwidth can enable either or both images to be upgraded in quality.

It should also be noted that the frame rate of the low resolution data and the frame rate of the high resolution data also affect bandwidth use, with higher frame rate consuming more bandwidth. Because humans do not process high resolution data very quickly (e.g. most people can't read a page in a book from a brief glance), the high resolution data can be sent at a lower frame rate than the low resolution data without degrading the user experience significantly. Using current technology, having the frame rate for the high resolution data typically be a small fraction, such as 10%, of the frame rate of the high resolution provides a satisfactory image. However, the exact frame rates used are not critical.

The low resolution camera 410 can be implemented by any means for providing low resolution data can be used. For example, a standard video camera can be used or a customized device that incorporates a CMOS image sensor as currently commonly used in low cost digital video cameras can be used. Any means for providing high resolution data can be used. For example, the high resolution camera 420 can be implemented as a high resolution CCD image sensor as currently used in digital still cameras that sends images to a computer (that can be inside the camera 420) that reads raw images or image subsets from the CCD image sensor, optionally compresses them, and sends them to the server 450.

The two cameras 410, 420 communicate with a computer 450 that can be a server through cables 411 and 421. The server 450 is in communication with a network through a cable 451. In place of or in addition to cables 411, 421, 451, any means of communication can be used, such as radio waves.

Figure 5:
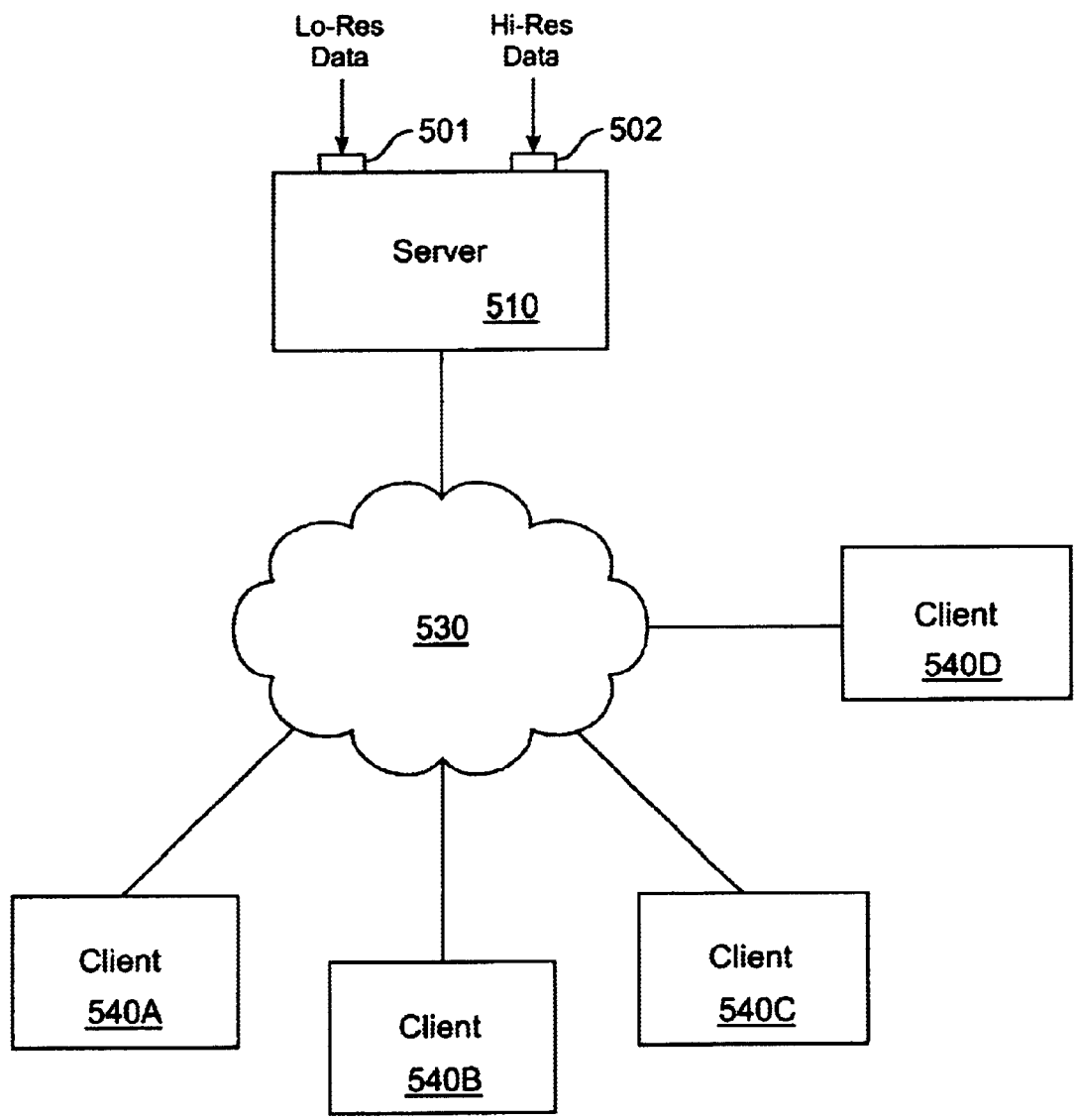
FIG. 5 illustrates a schematic drawing of a system on which embodiments of the invention can be implemented.

FIG. 5 shows a schematic overview of a teleconferencing system on which embodiments of the invention can be implemented. A server 510, which can correspond to server 450 of FIG. 4, receives low resolution data and high resolution data at one or more input ports 501, 502. In a preferred embodiment an input port 501 receives data from low resolution camera 410, and an input port 502 receives data from high resolution camera 420. The format of the data can be, but need not be, any standard digital video format. The server 510 is in communication with one or more clients 540A–540D through a network.

Figure 6:
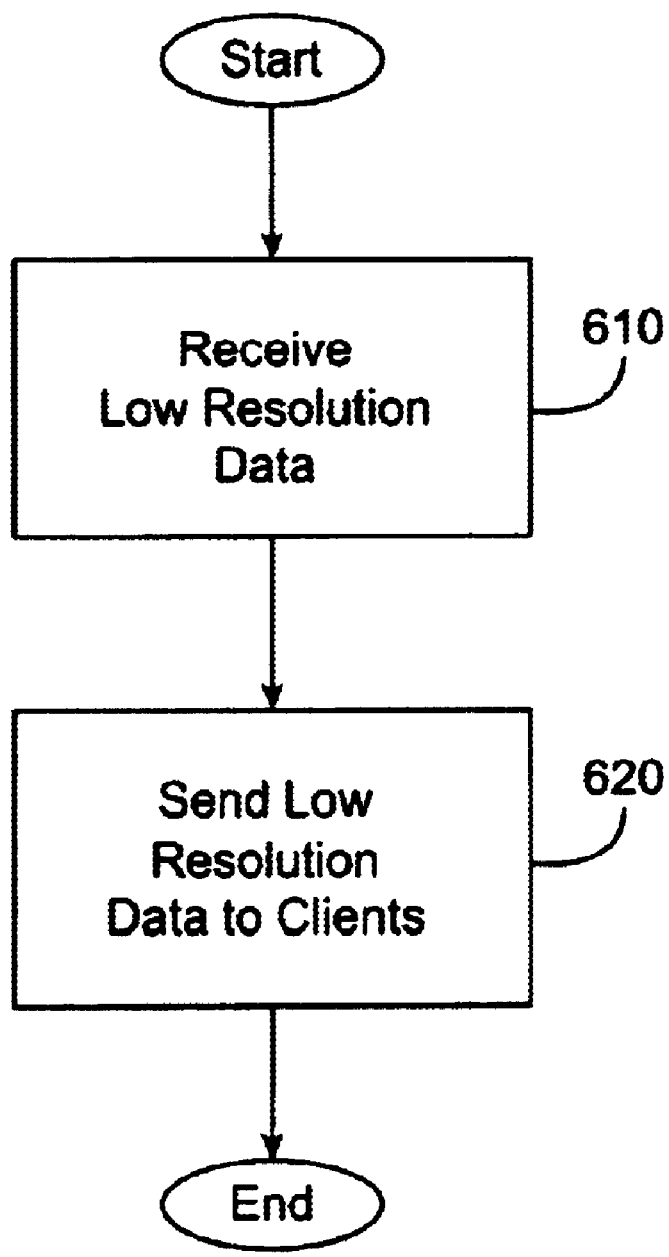
FIG. 6 is a process flow diagram illustrating sending low resolution data by the server.

FIG. 6 shows a process flow diagram for the server sending low resolution data to the clients. At a step 610, the server 510 receives low resolution data of the event from the low resolution camera 410. Preferably the data comprises a whole eye view of the event; i.e. it preferably includes substantially all areas of interest; e.g., in the case of a classroom presentation includes the lecturer and the chalkboard. The server sends the low resolution data to the clients that are part of the video conference using known methods. To keep track of the clients, the server can for instance keep a table that includes IP addresses of each client. Preferably, the entirety of the low resolution data is sent to the clients. In an alternative embodiment, a subset of the low resolution data can be selected, e.g., the edges of the image can be trimmed prior to sending the low resolution data to clients. The edges can be trimmed at the server, or alternatively when an implementation of the low resolution camera has the capability it can be done at the low resolution camera.

Figure 7:
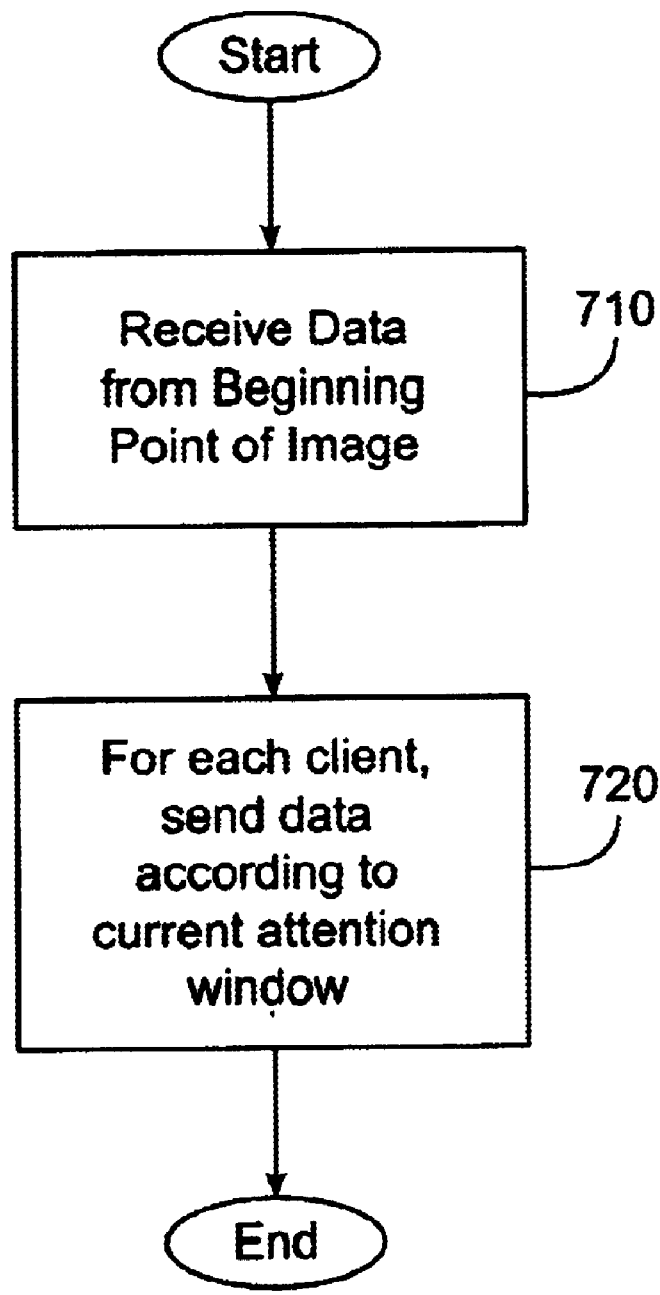
FIG. 7 is a process flow diagram illustrating sending high resolution data by the server.

FIG. 7 shows a process flow diagram for the server sending high resolution data to the clients. At a step 710, the server 510 receives high resolution data of the event from the high resolution camera 410. The data is received over communication link 421. For each client, the server sends a subset of the high resolution data according to the current attention window for that client for each cycle of image data, i.e. each time the beginning point of the image is received from the camera at a step 720. The attention window, can, for instance, comprise four pairs of pixel values representing the corners of a quadrangle, with the bottom left hand corner of the high resolution data at the server being (0,0). For each client, the server sends the high resolution data falling within the attention window to the client, subject to fine-tuning as described below with reference to FIGS. 10–11.

The data can be sent to the clients by any known method. Preferably the low resolution data and high resolution data are sent by the server to the clients using IP packets, as known in the art, and preferably multiple routers are available to handle the traffic. Although routers may send at a relatively low bandwidth, e.g. 64 kilobits or 112 kilobits (although gigabit routers are available), because typically a system includes several routers and only a subset of the data is being sent to each client, a network using today's technology can handle traffic for typical video teleconferencing using a method of the invention. Also preferably, the low resolution data, which preferably is the same for all clients, is sent in multicast packets when a system has multicast capability. Similarly, when multiple clients are being sent the same high resolution data, multicast packets can be used when a system has multicast capability.

Figure 8A:
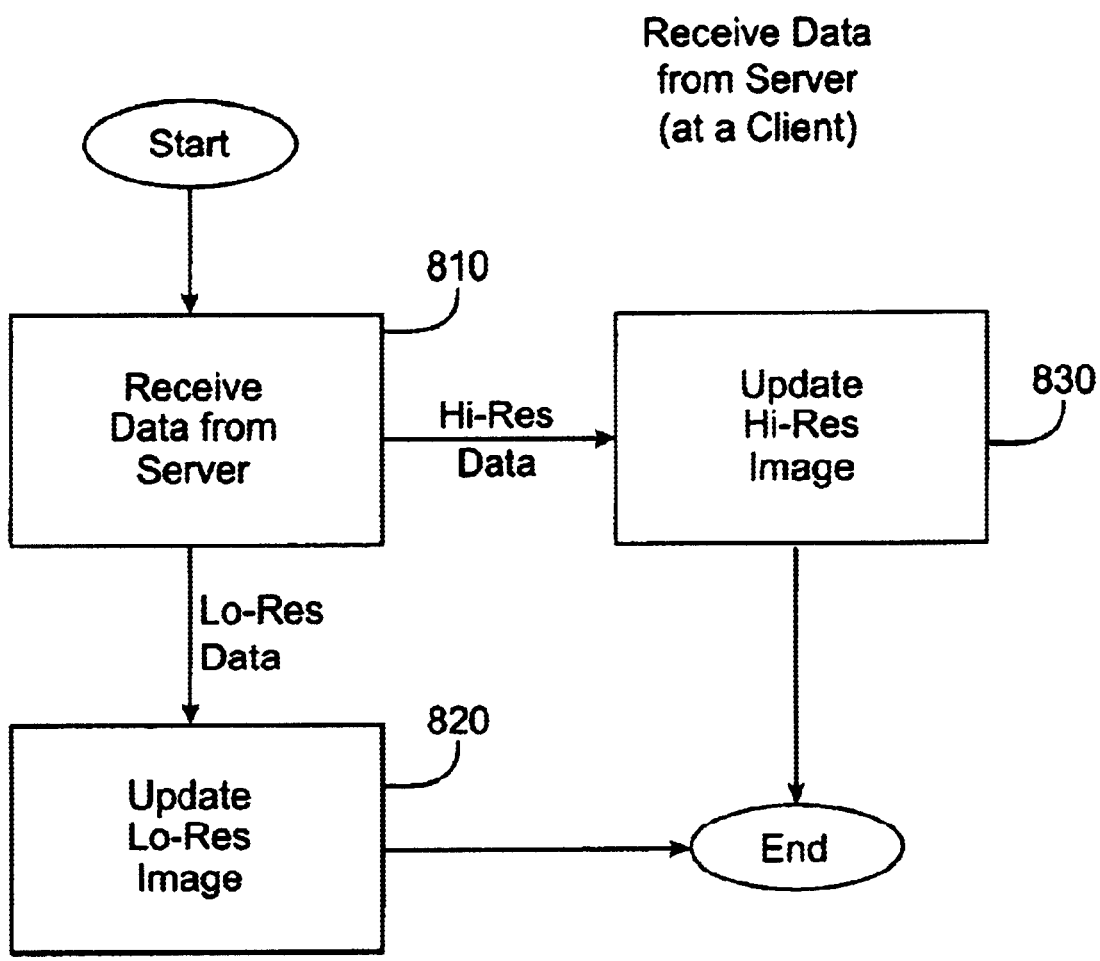
FIG. 8A is a process flow diagram illustrating receiving data from a video source at a client.

FIG. 8A is a process flow diagram of receiving data at the client. Preferably an application running at the client performs the steps shown in FIG. 8A. At a step 810, the client receives video data served by the server 510 in a preferred embodiment. If the data is low resolution data, the data is displayed at a step 820. If the data is high resolution data, the high resolution data is displayed at a step 830. Whether the data is high resolution data or low resolution can be established by any known method, for example putting a special header into the data section of each packet or by using a separate network session for each set of data.

Figure 8B:
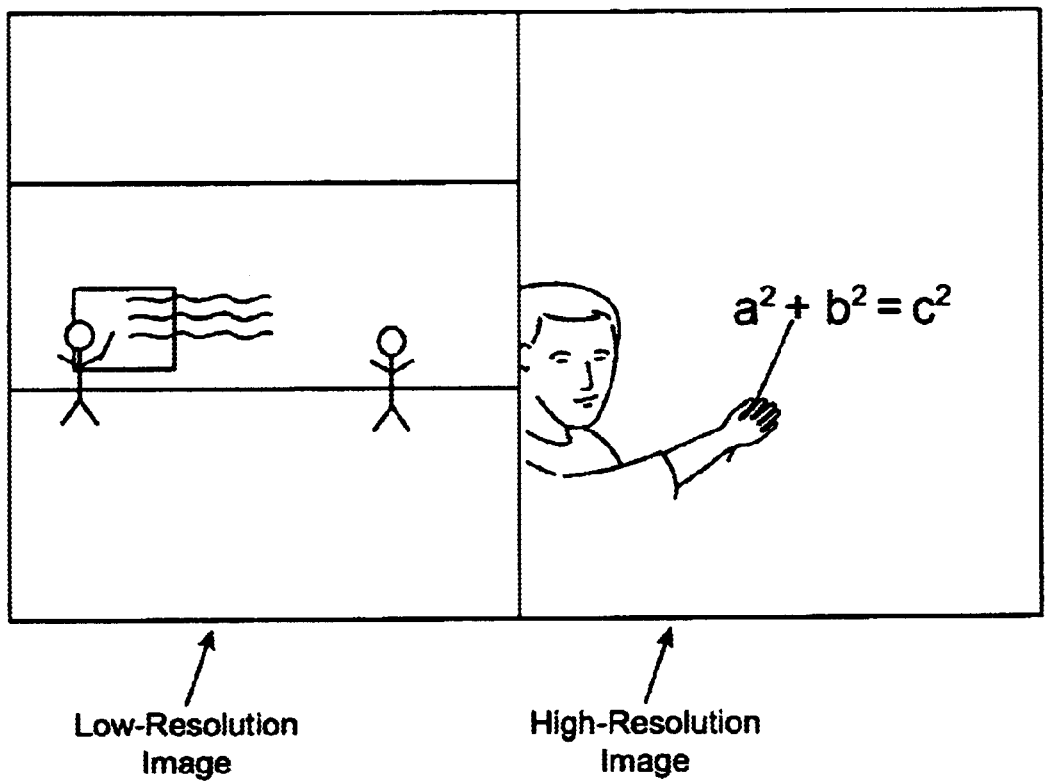
FIG. 8B is an schematic illustration of display of images at a client.

For each image, the data in a frame includes data sufficient for the pixels in the image to be recomputed. The low resolution and high resolution images preferably are each displayed in a separate window as illustrated in FIG. 8B. The windows can be of fixed size. Alternatively, the windows can be of adjustable size.

Figure 9:
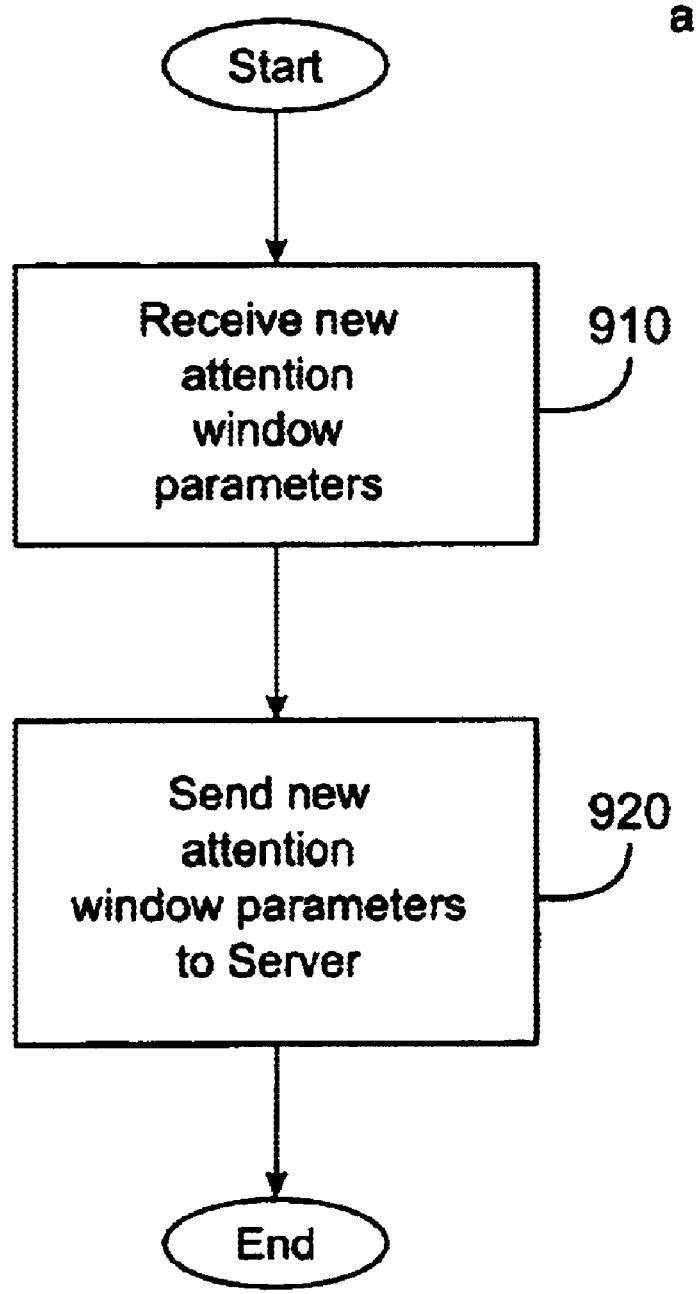
FIG. 9 is a process flow diagram illustrating changing an attention window at a client.

FIG. 9 is a process flow diagram of changing the attention window at a client. At a step 910, the application running on the client receives new attention window parameters. This can be accomplished by a signal to the program, for example an interrupt caused by a mouse click. For example, the user can drag a rectangle across the low resolution image or the high resolution image using a mouse, and then double click. The client application sends information to the server 510 about the new attention window parameters, including whether the rectangle overlies the high resolution image or the low resolution image, at a step 920. The attention window parameters can be any information sufficient for the server to identify some subset of data. In a preferred embodiment, the attention window information includes two vertices of a rectangle, each vertex represented by an (X,Y) pair of pixel values.

Figure 10:
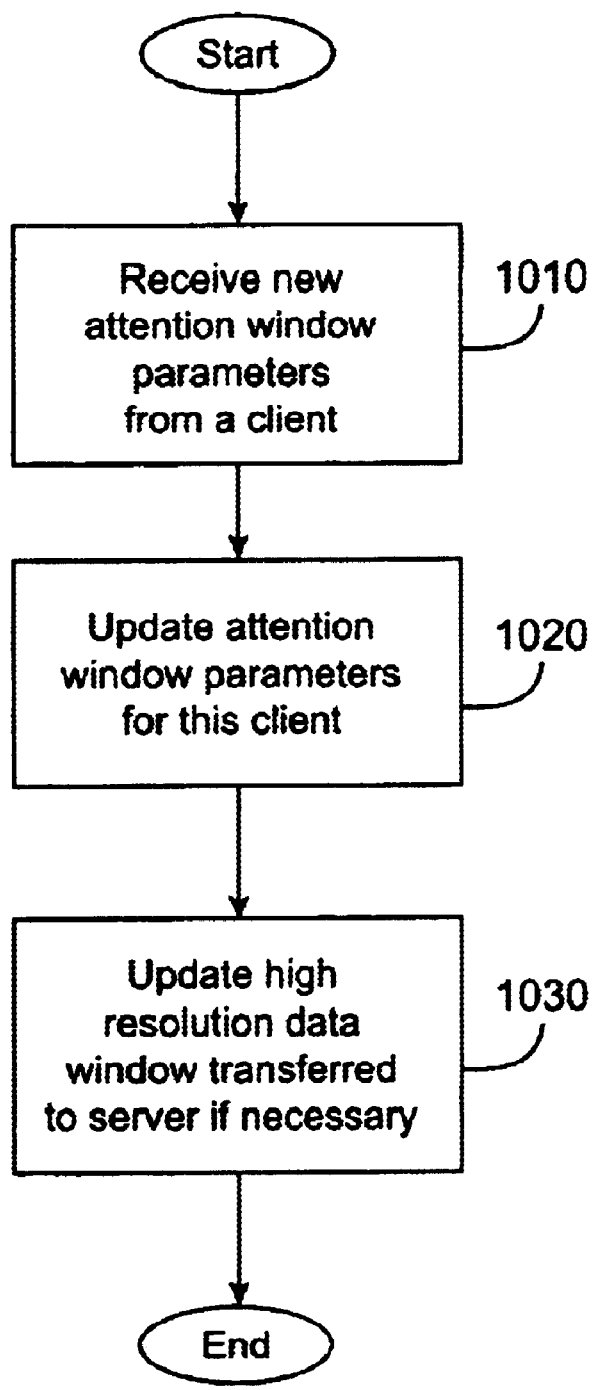
FIG. 10 is a process flow diagram illustrating changing an attention window at a server.

FIG. 10 is a process flow diagram of changing the attention window at the server for a client. The client can be any of the clients of the teleconference. At a step 1010 the server receives new attention window information from a client. At a step 1020, the server updates the attention window parameters for the client. In a preferred embodiment the attention window can refer to either the low-resolution image or the currently displayed high resolution image. For example, if a close-up of a chalkboard is displayed in the high resolution window, the user may select a subsection of the chalkboard to view. If necessary, mapping is performed to map the new attention window parameters to values relating to the high resolution data. For example, if the user has selected a subimage of a high resolution image, the value for the new window vertices as selected from the high resolution image would be offset by the amount the previous window was already offset from the entire high resolution image. Or if the attention window has been selected from a wide angle view, the values can be projected onto the high resolution image to obtain new attention parameters that correspond to the high resolution data. Note that the mapping need not be an exact mapping. For example, as a first approximation, an assumption can be made in appropriate cases that the high resolution image and low resolution image are centered on the same point, rather than taking painstaking measurements.

In an alternative embodiment, the attention window can be of fixed size, and can be selected only referring to the low resolution image. In such an embodiment the attention window can be displayed to the user as a rectangle floating over the low resolution image. Note also that the attention window need not be rectangular.

Alternatively the system can include a capability to reset all clients' attention window parameters when desired, for example setting them to focus on a slide whenever a new slide is introduced at the live presentation.

During the step 1020, the server can circumscribe choices as to the attention window parameters. For example, if the attention window parameters are for a quadrangle, the server can force the window to be instead a rectangle, for example by choosing the first and third vertices of the quadrangle to be the vertices of a rectangle. The server can also impose limitations on the size and/or resolution and/or updating of the attention window. For example, if the client requests that the attention window fill the entire space of the low resolution image, which would result in a unacceptably large amount of data being sent to the client, the application at the server can for example (1) choose to make the attention window smaller, (2) choose to send the data at lower resolution, or (3) choose to send all the data but to send updates to the image less frequently, or (4) some combination of the foregoing. Also by way of example, if the user selects a portion of the low resolution image for which no high resolution data is available, e.g. along an edge, an error message can be displayed.

Alternatively and additionally, the server can impose a window group on the new attention window. For example, if two or more users are data with a great deal of overlap, such as a close-up of the speaker's face, the users' attention windows can be forced to use the same window. This can be accomplished, for instance, by whenever new attention information is received, checking whether there is an amount of say, 80 percent, overlap in area with an already existing window, and if so assigning that existing window value to the client sending the new attention information. Also, for example, this can be accomplished by gridding the low resolution image into a number of rectangles, say 10 rectangles, and when new attention information is received, assigning the rectangle having the most overlap to the requesting client.

In one embodiment, only a subset of the high resolution data is transferred from the high resolution camera to the server. In such an embodiment, it is checked whether the new attention window is included in the subset of data currently being obtained by the server (not shown in FIG. 10). At a step 1030, the high resolution data being transferred to the server is updated if necessary, i.e. if the new attention window is included in the data currently being transferred, no action is taken. On the other hand, if the new attention window is not encompassed by the subset of data currently being transferred, then the subset of data being transferred is enlarged to encompass the new attention window. The subset of data can be defined in any way, for example it can conveniently be defined as the smallest rectangle encompassing all attention windows currently being used by clients. In an alternate embodiment, the entirety of the high resolution data is always transferred to the server; in such a case, step 1030 need not be performed.

A sample client list is shown in FIG. 11 for purposes of illustration. It includes the IP address, first corner of a rectangular window in pixels, second corner of a rectangular window in pixels, and a update period for updating the high resolution window. The value of 4 shown in FIG. 11 for update period indicates that only every fourth update is sent to that client; this may be done for instance because of the large amount of data in the attention window for that client. The period of updating is configurable at the server; it alternatively can be a fixed number for all teleconferences, or set in any other known way. The client list can include less information (e.g. in case of a fixed size rectangular attention window only one vertex need be recorded) or more information depending on the implementation. In addition, any known methods of keeping track of the various client information can be used instead of a list, for example a tree structure can be used.

While the above is a complete description of preferred embodiments of the invention, various alternatives, modifications, and equivalents can be used. It should be evident that the invention is equally applicable by making appropriate modifications to the embodiments described above. For example, the flowcharts are exemplary embodiments but steps may be added, deleted, combined, and reordered without departing from the spirit and scope of the invention. Therefore, the above description should not be taken as limiting the scope of the invention that is defined by the metes and bounds of the appended claims along with their full scope of equivalents.

For example, two separate applications at the client can handle display of the low resolution image and high resolution image. As an additional example, each camera can feed into a separate computer. Or there can be only one high resolution camera, with the data of the high resolution image being sampled to provide the low resolution data. Or, more than one attention window can be provided at a client. Some steps taken at the server, such certain constraints applied to the attention window, can instead be performed at the client.

The foregoing describes embodiments of an invention that can provide improved teleconferencing using today's hardware. Each client of a teleconference feed can obtain flexible views and choose details to focus on.

I claim:

1. A method for providing video teleconferencing comprising:

receiving a low resolution data stream comprising an image of a first field of view from an event;

receiving a high resolution data stream comprising a second image, said second image being of a second field of view, said second field of view including an area of overlap with the said first field of view;

sending the low resolution data stream to a plurality of clients; and for each of the plurality of clients performing:
simultaneously sending a subset of the high resolution data stream to said each of the plurality of clients; wherein said subset of the high resolution data stream is different for at least two of said plurality of clients.

2. A method as in claim 1, wherein said subset is selected in accordance with an attention window associated with said each of the plurality of clients.

3. A method as in claim 1, further comprising:
receiving updated attention window information for one or more of said plurality of clients.

4. A method as in claim 1, further comprising:
for one or more of said plurality of clients, updating an associated attention window in response to receiving updated window information.

5. A method as in claim 1, wherein said area of overlap comprises a majority of said field field of view.

6. The method of claim 1 wherein the high resolution data is sent at a lower frame rate than the low resolution data.

7. The method of claim 1 wherein sending the low resolution data steam comprises sending the same image to each of said plurality of clients.

8. The method of claim 1 wherein sending the low resolution data stream comprises sending multicast packets.

9. The method of claim 1 wherein sending low resolution data comprises sampling high resolution data.

10. A system for providing video teleconferencing comprising:
a processing system:
a memory storing code for operating said processing system, said code comprising:
code configured to receive a low resolution data stream comprising an image of a field of view of an event;
code configured to receive a high resolution data stream over a second field of view of the event, said second field of view including an area of overlap with the said first field of view;
code configured to send the low resolution data stream to a plurality of clients; and
code configured to, for each of the plurality of clients, simultaneously send a subset of the high resolution data stream to said each of the plurality of clients;
wherein said subset of the high resolution data stream is different for at least two of said plurality of clients.

11. A system as in claim 10 wherein said area of overlap comprises a majority of an area of said first field of view.

12. A computer program product for providing video teleconferencing comprising:
computer code that receives a low resolution data stream representing a view from an event;
computer code that receives a high resolution data stream over substantially the same view;
computer code that sends the low resolution data stream to a plurality of clients;
computer code that, for each of the plurality of clients, simultaneously sends a subset of the high resolution data stream to said each of the plurality of clients, wherein said subset of the high resolution data stream is different for at least two of said plurality of clients; and
a computer-readable medium for storing the codes.

13. The computer program product of claim 12, wherein the computer readable medium is a CD-ROM, floppy disk, tape, flash memory, system memory, hard drive, or data signal embodied in a carrier wave.

14. An apparatus for providing video teleconferencing comprising:
means for receiving a low resolution data stream comprising an image of a first field of view from an event;
means for receiving a high resolution data stream comprising a second image, said second image being of a second field of view, said second field of view including an area of overlap with the said first field of view;
means for sending the low resolution data stream to a plurality of clients; and
means for, for each of the plurality of clients, simultaneously sending a subset of the high resolution data stream to said each of the plurality of clients;
wherein said subset of the high resolution data stream is different for at least two of said plurality of clients.

* * * * *